United States Patent
Dubner

(10) Patent No.: US 12,033,497 B2
(45) Date of Patent: Jul. 9, 2024

(54) RISK ASSESSMENT FOR TEMPORARY ZONES

(71) Applicant: 3M INNOVATIVE PROPERTIES COMPANY, St. Paul, MN (US)

(72) Inventor: Andrew D. Dubner, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 334 days.

(21) Appl. No.: 17/603,105

(22) PCT Filed: Apr. 21, 2020

(86) PCT No.: PCT/IB2020/053769
§ 371 (c)(1),
(2) Date: Oct. 12, 2021

(87) PCT Pub. No.: WO2020/225634
PCT Pub. Date: Nov. 12, 2020

(65) Prior Publication Data
US 2022/0180738 A1 Jun. 9, 2022

Related U.S. Application Data

(60) Provisional application No. 62/843,776, filed on May 6, 2019.

(51) Int. Cl.
*G08G 1/01* (2006.01)
*B60W 30/095* (2012.01)
(Continued)

(52) U.S. Cl.
CPC ....... *G08G 1/0125* (2013.01); *B60W 30/0956* (2013.01); *G08G 1/0116* (2013.01);
(Continued)

(58) Field of Classification Search
CPC ...... G08G 1/00–137; G08G 1/16–166; B60W 30/095; B60W 30/0956; B60W 60/0059; G06V 20/54–588
See application file for complete search history.

(56) References Cited

U.S. PATENT DOCUMENTS 8,508,353 B2   8/2013  Cook
9,922,374 B1   3/2018  Vose
(Continued)

FOREIGN PATENT DOCUMENTS

JP    2010066895        3/2010
KR    100987177 B1     10/2010
(Continued)

OTHER PUBLICATIONS

International Search Report for PCT International Application No. PCT/IB2020/053769, mailed on Jul. 24, 2020, 4 pages.

*Primary Examiner* — Spencer D Patton

(57) ABSTRACT

Example systems disclosed herein include a temporary traffic control (TTC) zone monitoring system that assesses and responds to a risk of an adverse event in the TTC zone. The TTC zone monitoring system includes at least one sensor and a computing device. The computing device processes sensor data from the sensor to identify one or more features of the TTC zone. The features of the TTC zone include traffic control features, vehicle features, pathway features, or environmental features. The computing device determines a risk indicative of a risk of an adverse event in the TTC zone based on risk factors. Each of the risk factors is indicative of a risk of an adverse event associated with at least one feature the TTC zone and is based on adverse event data of the at least one feature. The computing device performs at least one operation based on the risk score.

14 Claims, 8 Drawing Sheets

(51) Int. Cl.
  *G08G 1/052*     (2006.01)
  *G08G 1/097*     (2006.01)
  *G08G 1/16*      (2006.01)
(52) U.S. Cl.
  CPC .......... *G08G 1/0145* (2013.01); *G08G 1/052* (2013.01); *G08G 1/097* (2013.01); *G08G 1/166* (2013.01)

(56) References Cited

U.S. PATENT DOCUMENTS

| | | |
|---|---|---|
| 10,055,796 B1 | 8/2018 | Vose |
| 2009/0326796 A1 | 12/2009 | Prokhorov |
| 2015/0189244 A1 | 7/2015 | Hegemann |
| 2018/0260907 A1 | 9/2018 | Bogovich et al. |
| 2018/0362031 A1 | 12/2018 | Chang |
| 2019/0039613 A1 | 2/2019 | Lee |
| 2019/0213881 A1 | 7/2019 | Bender |
| 2019/0258248 A1* | 8/2019 | Moran ................. G05D 1/0055 |
| 2020/0086855 A1* | 3/2020 | Packer ............ B60W 60/00276 |
| 2022/0410710 A1* | 12/2022 | Alalao ............... B60W 50/0097 |

FOREIGN PATENT DOCUMENTS

| | | | |
|---|---|---|---|
| WO | WO 2003-064237 | 8/2003 | |
| WO | WO 2016-028933 | 2/2016 | |
| WO | WO 2018-103313 | 6/2018 | |
| WO | WO-2018103313 A1 * | 6/2018 | ............... G08G 1/01 |

* cited by examiner

RISK ASSESSMENT FOR TEMPORARY ZONES

CROSS REFERENCE TO RELATED APPLICATIONS

This application is a national stage filing under 35 U.S.C. 371 of PCT/IB2020/053769, filed Apr. 21, 2020, which claims the benefit of U.S. Provisional Application No. 62/843,776, filed May 6, 2019, the disclosures of which are incorporated by reference in their entireties herein.

TECHNICAL FIELD

The present disclosure relates generally to temporary traffic control (TTC) zones and risk of an adverse event occurring in such TTC zones.

BACKGROUND

Vehicles configured with one or more image capture devices use the information captured by the one or more image capture devices to perform one or more processes. For example, information captured by an image capture device of an autonomous vehicle may be used by the autonomous vehicle to perform one or more autonomous or semi-autonomous functions, such as steering the car without driver input, braking upon identifying a road hazard, maintaining speed relative to a second moving vehicle, or any other autonomous or semi-autonomous function. In some examples, vehicles may travel through temporary traffic control (TTC) zones.

These TTC zones may present a vehicle with a higher complexity environment to navigate through than a pathway that does not include TTC zones. As such, a risk of adverse events occurring that are associated with vehicle travel may be different.

SUMMARY

This disclosure is directed toward a system that assesses and responds to risk in temporary traffic control (TTC) zones. A TTC zone may include various deviations from regular traffic travel through a pathway of the TTC zone. These deviations may result in an increase in adverse events, such as traffic accidents, occurring within the TTC zone. However, the TTC zone may include various features that create and/or indicate an increase of a risk of an adverse event occurring in the TTC zone. These features may be related to a pathway of the TTC zone, traffic passing through the TTC zone, traffic control devices within the TTC zone, or an environment of the TTC zone. Due to wide variations in design of TTC zones and traffic patterns through TTC zones, each TTC zone may have a unique risk profile. However, the various features of the TTC zone may each, or in combination, have a risk factor associated with the feature or combination of features. These risk factors may be based on historical data of adverse events that have occurred in the presence of similar features or combinations of features.

In some examples, a computing device may use sensor data to identify one or more features of the TTC zone. For example, a sensor positioned in proximity to the TTC zone may capture local data, such as image data, and external data, such as weather data, of the TTC zone, and identify positions of traffic control devices from the image data and weather conditions from the weather data. The computing device may determine a risk score that is indicative of a risk of an adverse event in the TTC zone. For example, the risk score may indicate a first degree of risk due to traffic deviations in the TTC zone and a second degree of risk due to weather conditions in the TTC zone. This risk score is based on one or more risk factors that each indicate a risk of an adverse event associated with the respective feature or combination of features of the TTC zone.

The risk score may be used in a variety of descriptive, prescriptive, and/or preventative applications. As one example, the risk score may be sent to a pathway-assisted autonomous vehicle (PAAV), which may receive the risk score and change a level of autonomous operation that is configured or selected to more safely navigate through the TTC zone based on the risk score. As another example, the risk score may be displayed as a spatial map with one or more indications of traffic control device positions that may reduce the risk score for the TTC zone. As yet another example, the risk score may be determined based on at least partially simulated data and used to generate a design of the TTC zone. In this way, a determined risk of the TTC zone may be used by one or more parties to more safely design, modify, or navigation through the TTC zone.

In some examples, a system includes at least one sensor and a computing device. The at least one sensor is configured to generate sensor data corresponding to a temporary traffic control (TTC) zone of a vehicle pathway. The computing device is configured to process the sensor data to identify one or more features of the TTC zone. The one or more features include at least one of traffic control features corresponding to traffic control infrastructure of the TTC zone, vehicle features corresponding to one or more vehicles travelling through the TTC zone, pathway features corresponding to pathway infrastructure of the vehicle pathway of the TTC zone, or environmental features corresponding to a local environment or setting of the TTC zone. The computing device is configured to determine, based on one or more risk factors, a risk score indicative of a risk of an adverse event in the TTC zone. Each of the one or more risk factors is indicative of a risk of an adverse event associated with at least one feature of the one or more features of the TTC zone based on adverse event data of the at least one feature of the one or more features. The computing device is configured to perform, based on the risk score, at least one operation.

In another example, a computing device includes one or more computer processors and a memory comprising instructions that, when executed by the one or more computer processors, cause the one or more computer processors to: receive sensor data corresponding to a temporary traffic control (TTC) zone of a vehicle pathway; process the sensor data to identify one or more features of the TTC zone, wherein the one or more features include at least one of traffic control features corresponding to traffic control infrastructure of the TTC zone, vehicle features corresponding to one or more vehicles travelling through the TTC zone, pathway features corresponding to pathway infrastructure of the vehicle pathway of the TTC zone, or environmental features corresponding to a local environment or setting of the TTC zone; determine, based on one or more risk factors, a risk score indicative of a risk of an adverse event in the TTC zone, wherein each of the one or more risk factors is indicative of a risk of an adverse event associated with at least one feature of the one or more features of the TTC zone based on adverse event data of the at least one feature of the one or more features; and perform, based on the risk score, at least one operation.

In yet another example, a pathway-article assisted vehicle (PAAV) includes at least one sensor and a computing device.

The at least one sensor is configured to generate sensor data corresponding to a temporary traffic control (TTC) zone of a vehicle pathway. The computing device is configured to receive the sensor data and receive a risk score indicative of a risk of an adverse event in a TTC zone of the vehicle pathway. The risk score is based on one or more risk factors. Each of the one or more risk factors is indicative of a risk of an adverse event in the TTC zone associated with at least one feature of one or more features of the TTC zone based on adverse event data of the at least one feature of the one or more features. The one or more features include at least one of vehicle features related to one or more vehicles travelling through the TTC zone, traffic control features related to traffic control infrastructure of the TTC zone, pathway features related to pathway infrastructure of the vehicle pathway of the TTC zone, or environmental features related to a local environment or setting of the TTC zone. The computing device is configured to modify, based on the risk score, operation of the PAAV.

The details of one or more examples are set forth in the accompanying drawings and the description below. Other features, objects, and advantages of the disclosure will be apparent from the description and drawings, and from the claims.

DETAILED DESCRIPTION

Figure 1:
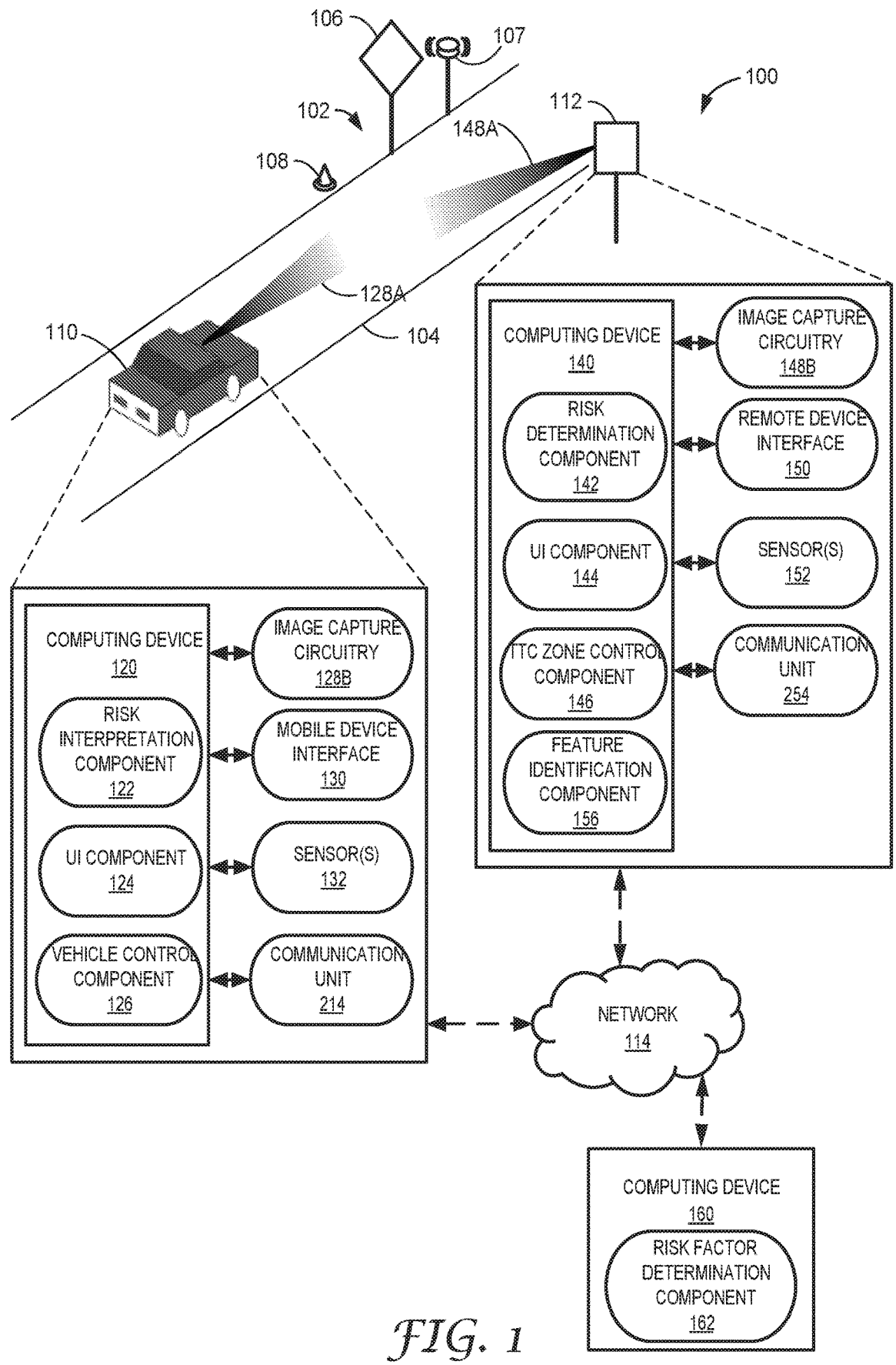
FIG. 1 is a block diagram illustrating an example system that includes a temporary traffic control (TTC) zone monitoring system configured to assess risk of a temporary traffic control (TTC) zone, in accordance with techniques of this disclosure.

FIG. 1 is a block diagram illustrating an example system 100 that includes a temporary traffic control (TTC) zone monitoring system 112 configured to assess risk of a temporary traffic control (TTC) zone 102, in accordance with techniques of this disclosure. As shown in FIG. 1, system 100 includes one or more vehicles, such as pathway assisted autonomous vehicle (PAAV) 110, that may operate on a vehicle pathway 104. Vehicle pathway 104 may be a road, highway, a warehouse aisle, factory floor, or a pathway not connected to the earth's surface. Vehicle pathway 104 may include portions not limited to the pathway itself. In the example of a road, vehicle pathway 104 may include the road shoulder, physical structures near the pathway such as toll booths, railroad crossing equipment, traffic lights, the sides of a mountain, guardrails, and generally encompassing any other properties or characteristics of the pathway or objects/structures in proximity to the pathway.

Vehicle pathway 104 may include a temporary zone, such as TTC zone 102, on vehicle pathway 104. TTC zone 102 may represent a section of vehicle pathway 104 that includes temporary changes to pathway infrastructure, such as through the use of traffic control devices. For example, TTC zone 102 may include a construction zone, a school zone, an event zone, an emergency zone, an alternate route, or other temporary section of road with changes to road infrastructure in which, for instance, the ordinary semantics of the road infrastructure are temporarily overridden, by a governmental or other authority, with modified operational requirements for vehicles operating in the temporary zone. A temporary change to pathway infrastructure may include a variety of lengths of time, including a short period, such as hours, or a longer period, such as a year.

TTC zone 102, or a section leading up to TTC zone 102, of pathway 104 may include traffic control devices, such as marker 108, transmitter 107, and pathway article 106, proximate to (i.e. in, adjacent, or leading up to) TTC zone 102. Markers 108 may be configured to indicate a feature of TTC zone 102. For example, markers 108 may indicate a beginning of TTC zone 102, a lateral limit of TTC zone 102, or another feature associated with TTC zone 102. Markers that may be used include, but are not limited to, cones, barrels, paint, and the like. In some examples, markers 108 may include machine-readable identifiers that indicate the feature of TTC zone 102. For example, markers 108 may include a code or pattern that corresponds to a programmable action for PAAV 110. As an example, a cone may include a pattern that is configured to indicate a rightmost road edge to a PAAV travelling in a southbound direction and a leftmost road edge to a PAAV travelling in a northbound direction. Such markers 108 may provide guidance to PAAV 110 in TTC zone 102 for dynamic and/or temporary traffic control. Pathway article 106 may include a variety of indicators and/or markers. For example, pathway article 106 may include one or more of an optical tag, a road sign, a pavement marker, a radio-frequency identification, a radio-frequency tag, an acoustic surface pattern, and a material configured to provide a RADAR signature to a RADAR system. Transmitter 107 may be configured to transmit one or more signals, such as a signal representing the risk score of TTC zone 102, to another entity, such as PAAV 110.

TTC zone 102 may have navigational characteristics that deviate from ordinary navigational characteristics of vehicle pathway 104. For example, TTC zone 102 may have navigational characteristics such as a traffic pattern change, worker presence, lane modifications, road surface quality, construction standards changes, or other conditions that are not normally present on or near vehicle pathway 104. Due to these temporary changes to pathway infrastructure in pathway 104, TTC zone 102 may have a different risk of an adverse event occurring in TTC zone 102 compared to ordinary conditions of pathway 104. An adverse event may include any event occurring on or near pathway 104 in TTC zone 102 that includes a realized or potential harm. Adverse events may include vehicle accidents or near misses between a vehicle and at least one of a traffic control feature of TTC zone 102, a pedestrian in TTC zone 102, a worker in TTC zone 102, another vehicle in TTC zone 102, and the like. In some examples, an adverse event in the TTC zone includes a collision involving a first vehicle and at least one of a pathway article, a second vehicle, a worker, or a pedestrian in TTC zone 102.

As an example, during normal operation of vehicles on vehicle pathway 104, vehicle pathway 104 may be a relatively high volume four lane roadway with a median. Due to construction on a first direction of the four-lane roadway, the first direction of the four-lane roadway may be closed and traffic travelling in the first direction may be rerouted to one of two lanes of a second direction of the four-lane roadway. This reroute may effectively turn the high traffic four-lane divided roadway into a high traffic two-lane undivided roadway requiring different rules of operation. The newly-created high traffic two-lane undivided roadway may have a different associated risk of an adverse event occurring in the high traffic two-lane undivided roadway than the high traffic four-lane divided roadway. For example, opposing traffic on an undivided roadway may have a higher likelihood and/or severity of a traffic accident than opposing traffic on a divided roadway. Additionally or alternatively, a transition from the high traffic four-lane divided roadway to the two-lane undivided roadway may have an associated risk. For example, a merge from two lanes down to one lane in each of the directions, followed by a lane shift for traffic in the first direction, may have an associated risk of an adverse event. In some examples, the navigational characteristics of TTC zone 102 may have associated operating rules for safely navigating TTC zone 102 that deviate from ordinary operating rules of vehicle pathway 104. For example, TTC zone 102 that includes a degraded road surface quality may have an associated lower speed limit, longer braking distance, and/or control system biased more toward traction control than an ordinary road surface.

Additionally or alternatively, a particular level of autonomous operation of a PAAV, such as PAAV 110, may not be suitable for TTC zone 102 having a particular risk of an adverse event. For example, a level of autonomous operation that is conditioned on a driver safely assuming operation of the vehicle in the event of an irregular hazard may not be suitable for TTC zone 102 for which there may be unexpected changes in features that may not allow for a timely and safe assumption of operation. As such, TTC zone 102 may have associated restrictions on levels of autonomous operation of vehicles based on a risk of an adverse event occurring in TTC zone 102.

A risk of an adverse event in TTC zone 102 may be associated with one or more features of TTC zone 102. The one or more features may include traffic control features corresponding to traffic control infrastructure of TTC zone 102, vehicle features corresponding to one or more vehicles travelling through TTC zone 102, pathway features corresponding to pathway infrastructure of vehicle pathway 104 of TTC zone 102, or environmental features corresponding to a local environment or setting of TTC zone 102. In the example provided above, the configuration of the traffic control features that direct traffic into a merge and lane shift may each or in combination increase a risk of an adverse event. Additionally, a vehicle feature of TTC zone 102, such as a high amount of traffic in TTC zone 102, a pathway feature of TTC zone 102, such as a hill and its associated lower visibility, or an environmental feature of TTC zone 102 such as rain, may further increase a risk of an adverse event occurring in TTC zone 102.

As shown in FIG. 1, system 100 includes TTC zone monitoring system 112 that may be positioned proximate to vehicle pathway 104 and that includes image capture device 128A and computing device 140. As will be described below, TTC zone monitoring system 112 is configured to identify one or more features of TTC zone 102, determine a risk score indicative of a risk of an adverse event in TTC zone based on one or more risk factors, and perform at least one operation based on the risk score.

Remote device interface 150 of computing device 140 may include a wired or wireless connection to a smartphone, tablet computer, laptop computer or similar device. In some examples, computing device 140 may communicate via remote device interface 150 for a variety of purposes such as receiving traffic, environmental, or pathway information, sending notifications, or other purposes. In some examples, computing device 140 may communicate to external networks 114, e.g. the cloud, via remote device interface 150. In other examples, computing device 140 may communicate via communication units 254.

One or more communication units 254 of computing device 140 may communicate with external devices by transmitting and/or receiving data. For example, computing device 140 may use communication units 254 to transmit and/or receive radio signals on a radio network such as a cellular radio network or other networks, such as networks 114. In some examples, communication units 254 may transmit and receive messages and information, such as information regarding a risk score of TTC zone 102, to and from vehicles, pathway articles, traffic control devices, or other systems capable of responding to changes in navigational characteristics of pathway 104 in TTC zone 102. In some examples, communication units 254 may transmit and/or receive satellite signals on a satellite network such as a Global Positioning System (GPS) network. In some examples, communications units 254 may transmit and/or receive data to a remote computing system, such as one or more risk factors corresponding to identified features of TTC zone 102 from computing device 160, through network 114.

Computing device 140 includes various components configured to perform various functions in assessing and responding to a risk of an adverse event occurring in TTC zone 102. In the example of FIG. 1, computing device 140 includes a risk determination component 142, a user interface (UI) component 144, a TTC zone control component 146, and a feature identification component 156. Components 142, 144, 146, and 156 may perform operations described herein using software, hardware, firmware, or a mixture of both hardware, software, and firmware residing in and executing on computing device 140 and/or at one or more other remote computing devices. In some examples, components 142, 144, 146, and 156 may be implemented as hardware, software, and/or a combination of hardware and software.

Computing device 140 may execute components 142, 144, 146, and 156 with one or more processors. Computing device 140 may execute any of components 142, 144, 146, and 156 as or within a virtual machine executing on underlying hardware. Components 142, 144, 146, and 156 may be implemented in various ways. Computing device 140 may include inputs from sensors 152, such as sensor related to traffic features such as traffic volume sensors and accelerometers; sensors related to environmental features such as moisture sensors, air temperature sensors, and light sensors; and similar sensing components.

UI component 144 may include any hardware or software for communicating with a user of TTC zone monitoring system 112, such as a traffic engineer with responsibility for a design of TTC zone 102. In some examples, UI component 144 includes outputs to a user such as a display screen, indicator or other lights, audio devices to generate notifications, or other audible functions. UI component 144 may also include inputs such as knobs, switches, keyboards, touch screens or similar types of input devices.

Feature identification component 156 may be configured to process sensor data to identify one or more features of TTC zone 102. As discussed above, various features of TTC zone 102, alone or in combination, may be associated with a risk of an adverse event occurring in TTC zone 102. In some instances, the features of TTC zone 102 may be contributing factors to an adverse event. For example, rain on pathway 104 of TTC zone 102 may increase a stopping distance for vehicles in TTC zone 102. By identifying rain on pathway 104 based on weather data, feature identification component 156 may identify a feature—rain—associated with a risk of an adverse event occurring in TTC zone 102. In some instances, the features of TTC zone 102 may be indicators of an adverse event. For example, traffic control devices may indicate a navigational characteristic, such as a merge or lane shift, that is associated with higher likelihood of a vehicle collision, without the actual traffic control devices being associated with a higher risk of an adverse event occurring in TTC zone 102. Regardless of whether the features of TTC zone 102 are contributing factors, indicators, or both, the features of TTC zone 102 more correspond to an increase in a risk of an adverse event occurring in TTC zone 102, whether by inherency of properties of the feature (e.g., through sensor data) or correlations of presence of the features with adverse events (e.g., through historical adverse event data).

Feature identification component 156 may receive sensor data regarding TTC zone 102. Sensor data may include any data generated from one or more sensors sensitive to conditions proximate to TTC zone 102, such as data received from sensors 152, external devices with sensors, or any other source that may assist in identifying features of TTC zone 102. Feature identification component 156 may receive sensor data from a variety of inputs. For example, feature identification component 156 may be communicatively coupled to at least one of image capture devices 128A or sensors 152 and configured to receive an image of TTC zone 102 from the at least one of image capture devices 128A or other sensor data from sensors 152. Feature identification component 156 may be configured to process the sensor data, such as by using image processing techniques.

In some examples, feature identification component 156 receives data from sensors 152. For example, feature identification component 156 may receive images of TTC zone 102 from image capture devices 148A. Data from sensors 152 may include, but is not limited to, weather conditions, traffic data, GPS data, road conditions, traffic control devices such as markers 108 or pathway articles 106, and the like. Sensors 152 from which data may be collected may include, but are not limited to, acoustic sensors, light sensors, temperature sensors, image sensors, radio frequency sensors, GPS devices, Light Detection and Ranging (LIDAR) sensors, and RADAR sensors.

In some examples, feature identification component 156 may collect data from external sources. For example, feature identification component 156 may collect traffic control feature data related to traffic control infrastructure of TTC zone 102 from a centralized database that includes plans of TTC zone 102, traffic information related to traffic in TTC zone 102, and/or environmental information related to an environment or setting of TTC zone 102. In some examples, computing device 160 may include a database that includes navigational conditions of TTC zone 102, such as location data, congestion data, vehicle behavior variability, speed, lane departure, acceleration data, brake actuation data, and the like. Such navigational characteristics and conditions may be official data, such as supplied by operators having control of the temporary zone or may be crowdsourced data, such as supplied by users travelling through the temporary zone.

Features of TTC zone 102 may include any features that may be differentiated in TTC zone 102 and correlated with a risk of an adverse event occurring in TTC zone 102. For example, historical data that includes sensor data and adverse event data of TTC zones or other pathway zones may indicate various features that, when present or quantified, may correlate with a risk of an adverse event occurring in TTC zone 102.

In some examples, features of TTC zone 102 may include traffic control features corresponding to traffic control infrastructure of TTC zone 102. In some examples, the traffic control features include one or more of a position or location of an infrastructure article or a type of an infrastructure article. In some examples, traffic control features may include a particular configuration of traffic control devices that indicates a classification of TTC zone 102. For example, a tapering series of cones may indicate a merge of traffic, which may have an associated risk of an adverse event. In some examples, the infrastructure article comprises at least one of a cone, barrel, barricade, lane marking, or sign in the TTC zone. In some examples, traffic control features may include combinations of traffic control features.

In some examples, features of TTC zone 102 may include vehicle features corresponding to one or more vehicles travelling through the TTC zone. For example, traffic patterns and behavior of vehicles travelling through TTC zone 102 may correspond to an increased risk of an adverse event occurring in TTC zone 102, such as a high amount of traffic in TTC zone 102 or high traffic speeds of vehicle in TTC zone 102. In some examples, the vehicle features include one or more of a speed of a vehicle or a plurality of vehicles in TTC zone 102, a number or rate of passage of a plurality of vehicles in TTC zone 102, a type of a vehicle in TTC zone 102, a position of a vehicle in TTC zone 102, a relative position of a plurality of vehicles in TTC zone 102, a pattern of behavior of a vehicle in TTC zone 102, or historical data of a particular vehicle or driver of a vehicle in TTC zone 102.

In some examples, features of TTC zone 102 may include pathway features corresponding to pathway infrastructure of vehicle pathway 104 of TTC zone 102. For example, a vehicle or driver of a vehicle encountering a particular pathway infrastructure may respond in such a way that a risk of an adverse event occurring in TTC zone 102 may increase.

In some examples, features of TTC zone 102 may include environmental features corresponding to a local environment or setting of the TTC zone. In some examples, the environmental features include one or more of a time of day, a type of a weather condition, a severity of a weather condition, or a time of year.

In some examples, feature identification component 156 may be configured to receive an image of a feature of TTC zone 102 and classify the feature based on at least the image of the feature of TTC zone 102. For example, the image of the feature of TTC zone 102 may be an image of one or more traffic control features, such as a construction sign, traffic cone, or other object, that indicates a configuration or design of a TTC zone 102. Based on various visual characteristics of the feature of TTC zone 102, feature identification component 156 may identify the feature of TTC zone 102. Visual characteristics of the representation of the feature may be any visual characteristic that may be used to differentiate the feature from other features including, but not limited to, a shape of the features, a color of the feature, a configuration of a group of features, a code located on the feature, and the like.

The identified features of TTC zone 102 may be used to determine a risk of TTC zone 102. Risk determination component 142 may be configured to determine, based on one or more risk factors, a risk score indicative of a risk of an adverse event in the TTC zone. Each of the one or more risk factors may be indicative of a risk of an adverse event associated with at least one feature of the one or more features of the TTC zone. The one or more risk factors may be based on adverse event data of at least one feature of the one or more features.

In some examples, risk determination component 142 receives risk factor data from an external device. For example, computing device 160 may include a database that includes data for risk factors that correspond to various features or combination of features of TTC zone 102, such as traffic pattern changes, presence of workers, lane width modification, curves, and shifts, road surface quality, and the like. These risk factors may be based on a variety of data sources that correlate and/or quantify a risk of an adverse event with a feature or combination of features of a TTC zone. In some examples, risk factors may be based on official data, such as supplied by operators having control of TTC zone 102 or other TTC zones having the feature or combination of features. For example, adverse events may be documented and associated with TTC zones having various features as adverse event data. This adverse event data may be processed to correlate and/or quantify a risk of an adverse event for the feature or combination of features. In some examples, risk factors may be based on crowd-sourced data, such as supplied by users travelling through TTC zones having the feature or combination of features. In some examples, risk determination component 142 retrieves risk factor data from an internal device, such as a storage device on computing device 140.

In some examples, risk determination component 142 generates risk factor data. For example, risk determination component 142 may receive data from various inputs and determine a navigational complexity of various features of TTC zone 102 based on the received data. The navigational complexity of the features of TTC zone 102 may represent the sensory and computational complexity of the navigational characteristics of TTC zone 102, such that risk determination component 142 may determine a risk of an adverse event occurring due to the navigational complexity of the features of TTC zone 102.

Risk determination component 142 calculates a risk score from the various risk factors for the identified features of TTC zone 102. For example, risk determination component 142 may use one or more algorithms, in combination with the various risk factors corresponding to the identified features of TTC zone 102, to generate a risk score that quantifies a risk due to or indicated by the various features of TTC zone 102. In some examples, risk determination component 142 may parameterize the one or more features of the zone based on the risk factors. For example, each of the risk factors may represent a relative amount of risk that a particular feature of TTC zone 102 presents to a vehicle or other entity travelling through TTC zone 102. By using the risk factors to quantify the risk presented by the presence of each feature or combination of features of TTC zone 102, risk determination component may create flexible measure of risk that may be quantifiable based on adverse event data generated from varied TTC zones have different configurations.

In some examples, TTC zone 102 may have more than one region within TTC zone 102. For example, as will be explained with respect to FIG. 3A, a TTC zone may have multiple regions, each with an associated risk score. As such, TTC zone 102 may have an overall risk score that represents a measure of risk of more than one region. For example, TTC zone 102 may includes a first region and a second region. In this instance, risk determination component 142 may be configured to determine a first risk score indicative of a risk of an adverse event occurring in the first region of the TTC zone that is based on one or more first risk factors indicative of risk of an adverse event associated with the one or more features of the first region of the TTC zone. Risk determination component 142 may also determine a second risk score indicative of a risk of an adverse in the second region of TTC zone 102 that is based on one or more second risk factors indicative of risk of an adverse event associated with the one or more features of the second region of TTC zone 102. Based on the first risk score of the first region and the second risk score of the second region, risk determination component 142 may determine an overall risk score of TTC zone 102. In some examples, the overall risk score may be an average of risk scores of regions within TTC zone 102. In some examples, the overall risk score may be a highest risk score of regions within TTC zone 102, indicating a highest risk score that may be encountered by a driver or PAAV travelling through TTC zone 102.

In the example of FIG. 1, computing device 160 includes risk factor determination component 162. Computing device 140 may communicate with computing device 160, which may control risk factor determination component 162. Risk factor determination component 162 may include risk factor data that associates (e.g., parameterizes) various features or combinations of features of TTC zones with a risk of an adverse event occurring in TTC zones. In some examples, risk factor determination component 162 is configured to store and maintain information related to risk factors of features of TTC zones. For example, risk factor determination component 162 may include one or more databases configured to store sensor data, adverse event data, and risk factor data.

In some examples, risk factor determination component 162 may apply a trained neural network to determine risk factors that correspond to features or combinations of features of TTC zones. For example, the neural network may receive historical data from a variety of inputs, such as sensory data, adverse event data, mapping data, weather data, and transient/dynamic data (e.g. worker presence). The neural network may classify the features based on the historical data and a trained set, such as by using parameterized algorithms or models that include weights for the various historical data inputs. Risk factor determination component 162 may output a set of confidence levels based on a variety of inputs. Risk factor determination component 162 may apply a feature vector to the one or more risk factors to a trained model and risk determination component 142 may determine, using the trained model, the risk score.

Risk factor determination component 162 may be configured to receive a request for risk factors indicated by features or combinations of features of TTC zone 102, look up risk factors indicated by the features or combinations of features of TTC zone 102, and output the risk factors indicated by features or combination of features of TTC zone 102, such as to computing device 140.

In some examples, risk determination component 142 may output an indication of the risk score of TTC zone 102. In some examples, computing device 140 may use the risk score from risk determination component 142 to generate notifications for a user of vehicles on pathway 104, e.g., notifications that indicate a risk score of TTC zone 102.

TTC zone control component 146 may be configured perform at least one operation based on the risk score. TTC zone control component 146 may be configured to perform a variety of operations based on the risk score. Operations may include, but are not limited to, outputting the risk score, such as a notification, transmission, other representation of the risk score; modifying an operation of a device, such as a display device, based on the risk score; or other action involving the risk score. For example, the risk score of TTC zone 102 represents a risk of an adverse event occurring in TTC zone 102, such that any system that is capable of responding to the risk of the adverse event, such as vehicles travelling through TTC zone 102, dynamic traffic control devices proximate to pathway 104, and systems used to configure TTC zone 102, may use the risk score or operation derived from the risk score to more safely, efficiently, or effectively respond to the risk of an adverse event occurring in TTC zone 102. As such, TTC zone control component 146 may perform any operation that may assist a vehicle, device, or person with utilizing the risk score.

In some examples, TTC zone control component 146 may transmit an indication of the risk score of TTC zone 102 to at least one vehicle in TTC zone 102. For example, in response to risk determination component 142 determining a risk score for TTC zone 102, computing device 140 may output a notification that PAAV 110 is approaching TTC zone 102 having the risk score. The notification may notify an operator of PAAV 110 that the operator may be required to resume manual operation of PAAV 110.

In some examples, TTC zone control component 146 may generate a spatial map that includes an indication of the risk score corresponding to a spatial representation of TTC zone 102. For example, TTC zone control component 146 may overlay a visual indication of a risk score, such as a heat map, with a map or other representation of TTC zone 102.

In some examples, TTC zone control component 146 may generate a roadway rule for TTC zone 102. For example, TTC zone 102 may be a configurable zone that includes a set of roadway rules. TTC zone control component 146 may configure one or more roadway rules of the set of roadway rules based on the risk score. For example, TTC zone control component 146 may generate a reduced speed limit in response to a higher risk score. In some examples, TTC zone 102 may include a display device configured to indicate at least one roadway rule of the set of roadway rules, such that TTC zone control component 146 may send an indication of the roadway rule to the display device.

In some examples, TTC zone control component 146 may generate a spatial placement of the one or more configurable objects that corresponds to a reduction in the risk score. For example, TTC zone 102 may be a configurable zone that includes one or more configurable objects, such as traffic control devices.

By assessing and responding to a risk of an adverse event occurring in TTC zone 102, computing device 140 may provide information in the form of a risk that enables other systems to more accurately, safely, and/or effectively navigate TTC zone 102. For example, the risk score may be a standardized measure of risk that may be actionable by different systems in different ways.

In some examples, a risk score may be used in particular by PAAVs to modify autonomous operation through TTC zone 102. As shown in FIG. 1, system 100 includes PAAV 110 that may operate on vehicle pathway 104 and that includes image capture device 128A and computing device 120. PAAV 110 of system 100 may be an autonomous or semi-autonomous vehicle, such as an ADAS, that takes cues from vehicle pathway 104 using vision systems or other sensors. In some examples, PAAV 110 may include occupants that may take full or partial control of PAAV 110. PAAV 110 may be any type of vehicle designed to carry passengers or freight including small electric powered vehicles, large trucks or lorries with trailers, vehicles designed to carry crushed ore within an underground mine, or similar types of vehicles. Some examples of PAAVs may include the fully autonomous vehicles and ADAS equipped vehicles mentioned above, as well as unmanned aerial vehicles (UAV) (aka drones), human flight transport devices, underground pit mining ore carrying vehicles, forklifts, factory part or tool transport vehicles, ships and other watercraft and similar vehicles. PAAV 110 may use various sensors to perceive the environment, infrastructure, and other objects around the vehicle. PAAV 110 may include other sensors 132 such as radar, sonar, lidar, GPS, and communication links for the purpose of sensing the vehicle pathway, other vehicles in the vicinity, environmental conditions around the vehicle and communicating with infrastructure. For example, a rain sensor may operate the vehicles windshield wipers automatically in response to the amount of precipitation, and may also provide inputs to the onboard computing device 120. These various sensors combined with onboard computer processing may allow the automated system to perceive complex information and respond to it more quickly than a human driver, as will be explained further below.

As shown in FIG. 1, PAAV 110 of system 100 may include image capture devices 128A. Image capture devices 128A may convert light or electromagnetic radiation sensed by one or more image capture sensors into information, such as digital image or bitmap comprising a set of pixels. Each pixel may have chrominance and/or luminance components that represent the intensity and/or color of light or electromagnetic radiation. In general, image capture devices 128A may be used to gather information about pathway 104. Image capture devices 128A may send image capture information to computing device 120 via image capture circuitry 128B. Image capture devices 128A may capture various features of pathway 104, such as lane markings, centerline markings, edge of roadway or shoulder markings, as well as the general shape of the vehicle pathway. The general shape of a vehicle pathway 104 may include turns, curves, incline, decline, widening, narrowing or other characteristics. Other components of PAAV 110 that may communicate with computing device 120 may include sensors 132, image capture circuitry 128B, described above, mobile device interface 130, and communication unit 214. In some examples image capture circuitry 128B, mobile device interface 130, and communication unit 214 may be separate from computing device 120 and in other examples may be a component of computing device 120.

Mobile device interface 130 may include a wired or wireless connection to a smartphone, tablet computer, laptop computer or similar device. In some examples, computing device 120 may communicate via mobile device interface 130 for a variety of purposes such as receiving traffic information, address of a desired destination or other purposes. In some examples computing device 120 may communicate to external networks 114, e.g. the cloud, via mobile device interface 130. In other examples, computing device 120 may communicate via communication units 214.

One or more communication units 214 of computing device 120 may communicate with external devices by transmitting and/or receiving data. For example, computing device 120 may use communication units 214 to transmit and/or receive radio signals on a radio network such as a cellular radio network or other networks, such as networks 114. In some examples communication units 214 may transmit and receive messages and information to other vehicles of system, such as a risk score for TTC zone 102 from TTC zone monitoring system 112. In some examples, communication units 214 may transmit and/or receive satellite signals on a satellite network such as a Global Positioning System (GPS) network. In some examples, communications units 214 may transmit and/or receive data to a remote computing system, such as computing device 140 or computing device 160, through network 114.

In the example of FIG. 1, computing device 120 includes a risk interpretation component 122, a user interface (UI) component 124, and a vehicle control component 126. Components 122, 124, and 126 may perform operations described herein using software, hardware, firmware, or a mixture of both hardware, software, and firmware residing in and executing on computing device 120 and/or at one or more other remote computing devices. In some examples, components 122, 124, and 126 may be implemented as hardware, software, and/or a combination of hardware and software.

Computing device 120 may execute components 122, 124, and 126 with one or more processors. Computing device 120 may execute any of components 122, 124, and 126 as or within a virtual machine executing on underlying hardware. Components 122, 124, and 126 may be implemented in various ways. For example, any of components 122, 124, and 126 may be implemented as a downloadable or pre-installed application or "app." In another example, any of components 122, 124, and 126 may be implemented as part of an operating system of computing device 120. Computing device 120 may include inputs from sensors not shown in FIG. 1 such as engine temperature sensor, speed sensor, tire pressure sensor, air temperature sensors, an inclinometer, accelerometers, light sensor, and similar sensing components.

UI component 124 may include any hardware or software for communicating with a user of PAAV 110. In some examples, UI component 124 includes outputs to a user such as displays, such as a display screen, indicator or other lights, audio devices to generate notifications or other audible functions. UI component 124 may also include inputs such as knobs, switches, keyboards, touch screens or similar types of input devices.

Risk interpretation component 122 may be configured to receive a risk score and process the risk score to obtain information related to navigation of TTC zone 102. In some examples, information related to navigation of TTC zone 102 includes a set of operating rules (also referred to as an "operating rule set") used by PAAV 110 to navigate TTC zone 102. For example, as will be explained below, vehicle control component 126 may operate according to operating rules of one or more operating rule sets. An operating rule may be any navigational rule based on navigational characteristics of pathway 104, including the temporary zone, and associated with autonomous or semi-autonomous operation of PAAV 110. An operating rule set may describe navigational characteristics of the temporary zone. For example, a temporary zone may have specific navigational characteristics that require or recommend a particular operating rule set. The particular operating rule set may, for example, change a priority of information received from sensors, change a response of PAAV 110 to a navigational stimulus, and the like. A change in an operating rule set of PAAV 110 may result in a change in how PAAV 110 responds to a particular navigational stimulus. Operating rules that may be used include, but are not limited to, speed limits, acceleration limits, braking limits, following distance limits, lane markings, distance limits from workers, and the like.

In some examples, the risk score indicates an operating rule set for PAAV 110 to navigate the temporary zone. Risk interpretation component 122 may obtain the operating rule set based on the risk score. For example, the risk score may indicate a particular operating rule set associated with the temporary zone. In some examples, risk interpretation component 122 may obtain the operating rule set from storage (e.g. memory) located on computing device 120. For example, the risk score may be associated with a category of TTC zone 102, such that risk interpretation component 122 may look up the operating rule set associated with that category of TTC zone. In such examples, risk interpretation component 122 accesses a local or remote data structure mapping the risk score to the set of operations to be applied by PAAV 110 and provides the set of operations to vehicle control component 126 to modify the operation of the PAAV 110.

In some examples, risk interpretation component 122 may obtain the operating rule set from an external device, such as computing device 160 through network 114. For example, interpretation component 122 may output a request to computing device 160 for the operating rule set. For example, TTC zone 102 may include unique features that utilize a unique operating rule set. By including an operating rule set on a centralized server, such as a server controlled by a same entity as TTC zone 102, PAAV 110 may better navigate TTC zone 102 based on the operating rule set.

In some examples, the risk score of TTC zone 102 may be associated with a classification of TTC zone 102 that corresponds to a level of autonomous operation of PAAV 110. For example, the risk score of TTC zone 102 may further indicate a complexity of the navigational characteristics of TTC zone 102. In some instances, this classification may correspond to an upper limit on autonomous operation within the temporary zone. For example, the risk score of TTC zone 102 may indicate a complexity that is so high that autonomous operation of a vehicle through TTC zone 102 may be limited to levels of autonomous operation in which a human driver monitors the driving environment (i.e. levels 0-2 of SAE J3016 levels of autonomy). In some instances, this classification may correspond to a lower limit on autonomous operation within the temporary zone. For example, a temporary zone may include sudden and unpredictable infrastructure changes, such that autonomous operation of a vehicle may be limited to levels of autonomous operation in which a human driver is not a fallback performer (i.e. levels 4-5 of SAE J3016 levels of autonomy). A change in a level of autonomous operation of PAAV 110 may result in a change in how PAAV 110 responds to a particular navigational stimulus.

In some examples, the risk score indicates a level of autonomous operation of PAAV 110 required to navigate the temporary zone. Risk interpretation component 122 may obtain a level of autonomous operation of PAAV 110 based on the interpretation of the risk score. In some examples, the risk score may indicate a threshold level of autonomous operation for the temporary zone. For example, the risk score may indicate that TTC zone 102 may not be safe for a high level of autonomous operation due to navigational characteristics of the temporary zone, such as complex instructions or particular safety considerations such as unpredictable operations of road workers and road working equipment. As such, the risk score may indicate a maximum level of autonomous operation permitted for PAAV 110 within TTC zone 102. As another example, TTC zone 102 may not be safe for a low level of autonomous operation due to navigational characteristics of TTC zone 102, such as features that may not allow a hand-off to an operator. As such, the risk score may indicate a minimum level of autonomous operation permitted for PAAV 110 within the temporary zone. In some examples, risk interpretation component 122 may use the risk score to obtain the level of autonomous operation locally, such as from storage located on computing device 120, or remotely, such as from storage located on computing device 160.

In some examples, computing device 120 may use information from risk interpretation component 122 to generate notifications for a user of PAAV 110, e.g., notifications that indicate a navigational characteristic or condition of vehicle pathway 104. For example, in response to risk interpretation component 122 obtaining the risk score of TTC zone 102, computing device 120 may output a notification that PAAV 110 is approaching a TTC zone having the risk score. The notification may notify an operator of PAAV 110 that the operator may be required to resume manual operation of PAAV 110.

Computing device 120 includes vehicle control component 126 to control autonomous operation of PAAV 110. Vehicle control component 126 may be configured to receive navigational information corresponding to the risk score. In some examples, vehicle control component 126 may receive an operating rule set that describes navigational characteristics of TTC zone 102. For example, in response to risk interpretation component 122 outputting a request for the operating rule set, vehicle control component 126 may receive the operating rule set. In some examples, vehicle control component 126 may receive a classification of TTC zone 102, such as a level or threshold level of autonomous operation for TTC zone 102, that corresponding to a risk level of TTC zone 102.

In some examples, vehicle control component 126 may be configured to output, based on the risk score of TTC zone 102, information to perform at least one operation of PAAV 110 within TTC zone 102. For example, vehicle control component 126 may be configured to output any information to a component of PAAV 110 to perform an operation of PAAV 110, such as navigation of TTC zone 102 or notification of the risk score of TTC zone 102 to an operator of PAAV 110.

In some examples, vehicle control component 126 may be configured to output, based on the risk score of TTC zone 102 and to a pathway-article assisted vehicle (PAAV), a mode of autonomous operation of PAAV 110 for operation of PAAV 110 within TTC zone 102. A mode of autonomous operation may represent a set of autonomous or semi-autonomous responses of PAAV 110 to navigational stimuli received by PAAV 110. Navigational stimuli may include any sensory input that may be used for navigation. Vehicle control component 126 may output the mode of autonomous operation to, for example a component of PAAV 110 responsible for controlling navigational operations of PAAV 110.

In some examples, such as examples in which vehicle control component 126 is responsible for directly controlling navigation of PAAV 110, vehicle control component 126 may be configured to modify, based on the indication of the temporary zone, the mode of autonomous operation of PAAV 110 while operating within the temporary zone on the vehicle pathway. For example, PAAV 110 may detect a navigational stimulus from a sensor, such as a lane marker from one of image capture devices 128A. Based on characteristics of the lane marker, such as a position of the lane marker with respect to PAAV 110, PAAV 110 may perform a first operation, such as notifying a driver that the lane marker is near, in a first mode of autonomous operation and perform a second operation, such as avoiding the lane marker, in a second mode of operation. As such, a change in a mode of autonomous operation may include changing a response of PAAV 110 to the navigational stimulus, such as through different operating rules or different levels of autonomous operation.

In examples where the indication of the temporary zone includes the risk score, vehicle control component 126 may be configured to modify, based on the risk score of TTC zone 102, a mode of autonomous operation of PAAV 110 while operating within TTC zone 102. In some examples, such as examples where the risk score indicates an operating rule set for TTC zone 102, vehicle control component 126 may be configured to modify the mode of autonomous operation by updating a current operating rule set with the operating rule set indicated by the risk score. For example, vehicle control component 126 may direct operations of PAAV 110, such as responses of PAAV 110 to navigational stimuli, within TTC zone 102 according to the updated operating rule set. The updated operating rule set may provide vehicle control component 126 with supplemental or replacement operating rules that may be directed toward localized conditions in TTC zone 102.

In some examples, vehicle control component 126 may be configured to modify the mode of autonomous operation by changing a level of autonomous operation to the level of or within the threshold of autonomous operation indicated by or determined from the risk score. For example, if the risk score of TTC zone 102 indicates a maximum level of autonomous operation permitted for PAAV 110 within TTC zone 102 and vehicle control component 126 is operating PAAV 110 above the maximum level of autonomous operation permitted for PAAV 110 in TTC zone 102 for the risk score, vehicle control component 126 may reduce the level of autonomous operation of the PAAV to the maximum level indicated by the risk score, such as by outputting a reduced level of autonomous operation or selecting an operating rule set associated with a reduced level of autonomous operation. As another example, if the risk score indicates a minimum level of autonomous operation permitted for PAAV 110 within the temporary zone and vehicle control component 126 is operating PAAV 110 below the minimum level of autonomous operation permitted for PAAV 110, vehicle control component 126 may determine PAAV 110 does not have a level of autonomous vehicle operation capability to meet the minimum level indicated by the risk score and output an alert to a driver to begin non-autonomous operation of PAAV 110.

In some examples, vehicle control component 126 may select a level of autonomous operation based on the risk score, such as may be established by the entity controlling the temporary zone (e.g., Department of Transportation). For example, a maximum or minimum level of autonomous operation may be based on road conditions, temporary zone conditions (e.g., whether workers are present, whether equipment is present, a time of day, weather), a temporary zone type (e.g., school zone, emergency event, street cleaning, snow plowing, etc.), and the like, that may be correlated with a particular risk score.

In some examples, vehicle control component 126 may select a level of autonomous operation based on insurance requirements or manufacturer requirements, such as may be established by an insurance company or other financially interested third party. For example, a minimum or maximum level of autonomous operation may be based on the risk score.

Vehicle control component 126 may include, for example, any circuitry or other hardware, or software that may adjust one or more functions of the vehicle. Some examples include adjustments to change a speed of the vehicle, change the status of a headlight, changing a damping coefficient of a suspension system of the vehicle, apply a force to a steering system of the vehicle or change the interpretation of one or more inputs from other sensors. For example, an IR capture device may determine an object near the vehicle pathway has body heat and change the interpretation of a visible spectrum image capture device from the object being a non-mobile structure to a possible large animal that could move into the pathway. Vehicle control component 126 may further control the vehicle speed as a result of these changes. In some examples, the computing device initiates the determined adjustment for one or more functions of PAAV 110 based on the second information in conjunction with a human operator that alters one or more functions of PAAV 110 based on the first information.

In some example, computing device 120 may modify a priority of sensor data based on a risk score of TTC zone 102 when PAAV 110 is passing through TTC zone 102. PAAV 110 may use information from a variety of sensors, such as radar or ultrasound distance sensors, lane markings on the vehicle pathway captured from image capture devices 128A, information from GPS, and the like. For example, computing device 120 may consider the various inputs (p) and consider each with a weighting value, such as in a decision equation, as local information to improve the decision process. One possible decision equation may include:

$$D = w_1 * p_1 + w_2 * p_2 + \ldots w_n * p_n + w_{RS} * p_{RS}$$

where the weights ($w_1$-$w_n$) may be a function of the risk score ($p_{RS}$). In the example of a construction zone, an enhanced sign may indicate a lane shift from the construction zone. Therefore, computing device 120 may de-prioritize signals from lane marking detection systems when operating the vehicle in the construction zone.

In some examples, PAAV 110 may be a test vehicle that may determine one or more navigational characteristics of vehicle pathway 104 and may include additional sensors as well as components to communicate to a database that includes sensor data for TTC zone 102. As a test vehicle, PAAV 110 may be autonomous, remotely controlled, semi-autonomous or manually controlled. One example application may be to generate adverse event data for TTC zone 102.

Figure 2A:
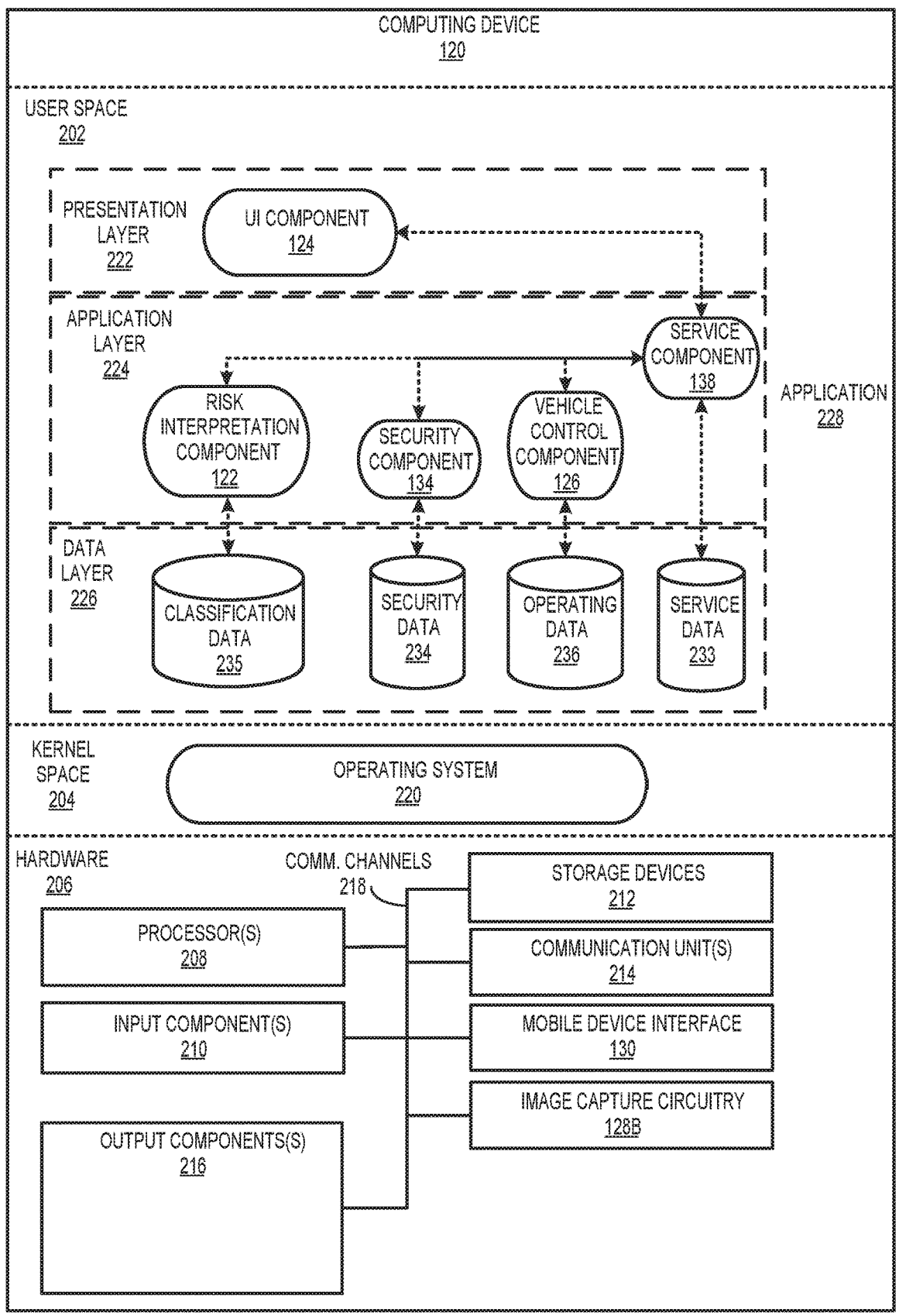
FIG. 2A is a block diagram illustrating an example computing device, in accordance with one or more aspects of the present disclosure.

FIG. 2A is a block diagram illustrating an example computing device, in accordance with one or more aspects of the present disclosure. FIG. 2A illustrates only one example of a computing device. Many other examples of computing device 120 may be used in other instances and may include a subset of the components included in example computing device 120 or may include additional components not shown example computing device 120 in FIG. 2A.

In some examples, computing device 120 may be a server, tablet computing device, smartphone, wrist- or head-worn computing device, laptop, desktop computing device, or any other computing device that may run a set, subset, or superset of functionality included in application 228. In some examples, computing device 120 may correspond to vehicle computing device 120 onboard PAAV 110, depicted in FIG. 1. In other examples, computing device 120 may also be part of a system or device that determines responds to a risk score by performing functions other than navigation, such as a traffic control device that performs an operation based on the risk score.

As shown in the example of FIG. 2A, computing device 120 may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 2, hardware 206 includes one or more processors 208, input components 210, storage devices 212, communication units 214, output components 216, mobile device interface 130, and image capture circuitry 128B. Processors 208, input components 210, storage devices 212, communication units 214, output components 216, mobile device interface 130, and image capture circuitry 128B may each be interconnected by one or more communication channels 218. Communication channels 218 may interconnect each of the components 128B, 104, 208, 210, 212, 214, and 216 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 120. For example, processors 208 on computing device 120 may receive and execute instructions stored by storage devices 212 that provide the functionality of components included in kernel space 204 and user space 202. These instructions executed by processors 208 may cause computing device 120 to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of computing device 120 may receive input. Examples of input are tactile, audio, kinetic, and optical input, to name only a few examples. Input components 210 of computing device 120, in one example, include a mouse, keyboard, voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more communication units 214 of computing device 120 may communicate with external devices by transmitting and/or receiving data. For example, computing device 120 may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

In some examples, communication units 214 may receive data that includes information regarding a risk score of TTC zone 102, such as an operating rule set for navigating TTC zone 102 or a level of autonomous control of TTC zone 102. In examples where computing device 120 is part of a vehicle, such as PAAV 110 depicted in FIG. 1, communication units 214 may receive information about TTC zone 102 from an image capture device, as described in relation to FIG. 1. In other examples, such as examples where computing device 120 is part of a system or device that determines one or more risk factors corresponding to features of TTC zone 102, communication units 214 may receive data from a test vehicle, handheld device or other means that may gather data that indicates the risk factors associated with features of TTC zone 102, as described above in FIG. 1 and in more detail below. Computing device 120 may receive updated information, upgrades to software, firmware, and similar updates via communication units 214.

One or more output components 216 of computing device 120 may generate output. Examples of output are tactile, audio, and video output. Output components 216 of computing device 120, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 216 may be integrated with computing device 120 in some examples. In other examples, output components 216 may be physically external to and separate from computing device 120, but may be operably coupled to computing device 120 via wired or wireless communication. Output components 216 may also include vehicle control component 126, in examples where computing device 120 is onboard a PAAV. Vehicle control component 126 has the same functions as vehicle control component 126 described in relation to FIG. 1.

One or more storage devices 212 within computing device 120 may store information for processing during operation of computing device 120. In some examples, storage device 212 is a temporary memory, meaning that a primary purpose of storage device 212 is not long-term storage. Storage devices 212 on computing device 120 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2A, application 228 executes in user space 202 of computing device 120. Application 228 may be logically divided into presentation layer 222, application layer 224, and data layer 226. Presentation layer 222 may include user interface (UI) component 228, which generates and renders user interfaces of application 228. Application 228 may include, but is not limited to: UI component 124, risk interpretation component 122, security component 134, and one or more service components 138. For instance, application layer 224 may include risk interpretation component 122, service component 134, vehicle control component 126, and security component 136. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data.

Security data 234 may include data specifying one or more validation functions and/or validation configurations. Service data 233 may include any data to provide and/or resulting from providing a service of service component 138. For instance, service data may include information about pathway articles (e.g., security specifications), user information, operating rule sets, levels of autonomous operation, or any other information transmitted between one or more components of computing device 120. Classification data 235 may include data for classifying a level of autonomous operation of TTC zone 102 based on the risk score. For example, classification data may include thresholds for autonomous navigation corresponding to various risk scores. Operating data 236 may include instructions for operating PAAV 110. Operating data may include one or more operating rule sets, one or more operating protocols for various levels of autonomous operation, and the like.

In the example of FIG. 2A, one or more of communication units 214 may receive, from one or more sensors, sensor data corresponding to TTC zone 102 and data from TTC zone monitoring system 112, indicating a risk score for TTC zone 102. In some examples, UI component 124 or any one or more components of application layer 224 may receive the sensor data and risk score and store the sensor data and risk score.

Service component 138 may perform one or more operations based on the data generated by security component 134 that indicates whether traffic control devices of TTC zone 102 are counterfeit. Service component 138 may, for example, query service data 233 to retrieve a list of recipients for sending a notification or store information that indicates details of an image of the traffic control device of TTC zone 102 (e.g., object to which pathway article is attached, image itself, metadata of image (e.g., time, date, location, etc.)). In response to, for example, determining that PAAV 110 does not have a level of autonomous vehicle operation capability to meet a minimum level, service component 138 may send data to UI component 124 that causes UI component 124 to generate an alert to a driver to begin non-autonomous operation of PAAV 110. UI component 124 may send data to an output component of output components 216 that causes the output component to display the alert.

Figure 2B:
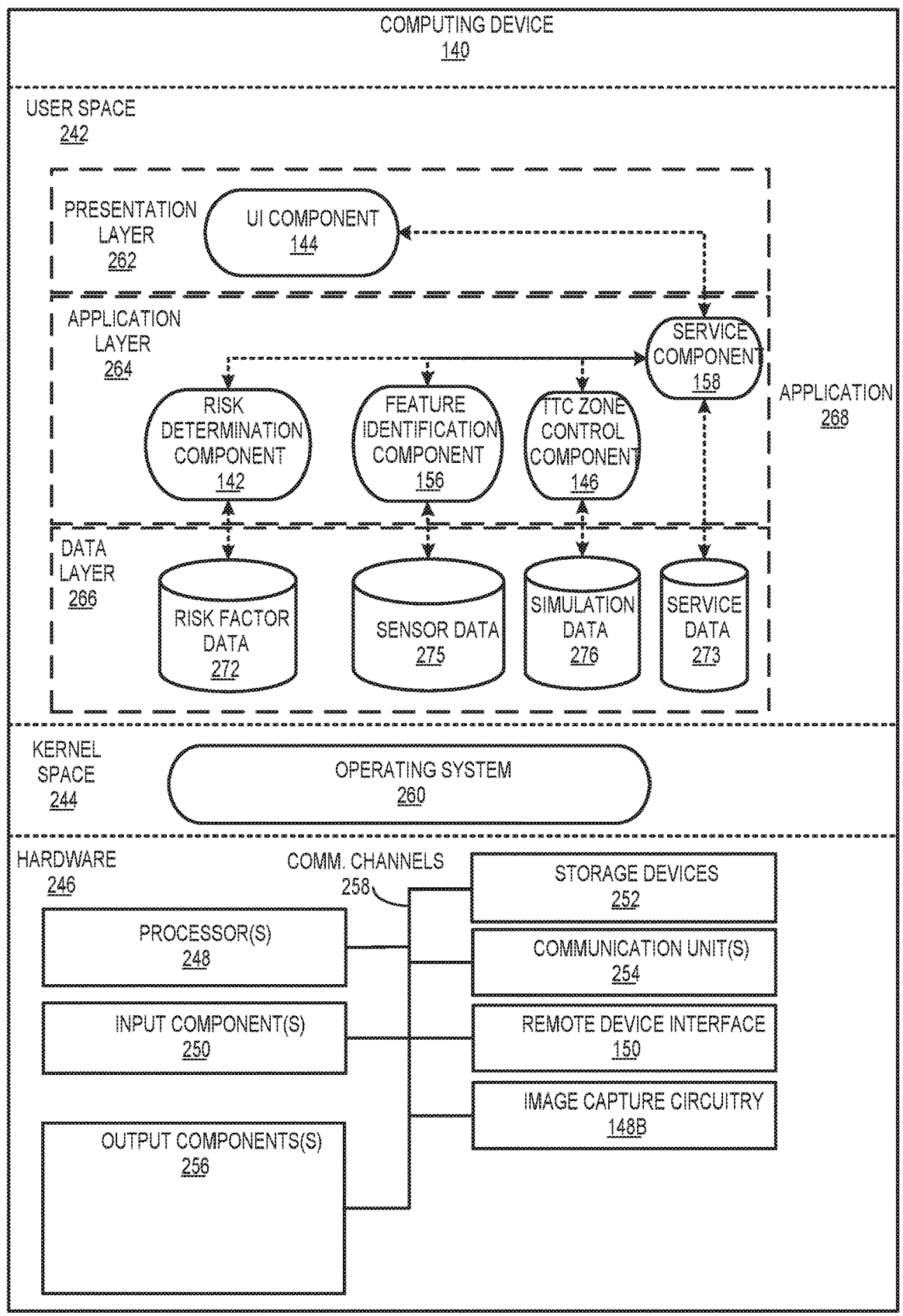
FIG. 2B is a block diagram illustrating an example computing device, in accordance with one or more aspects of the present disclosure.

FIG. 2B is a block diagram illustrating an example computing device 140, in accordance with one or more aspects of the present disclosure. FIG. 2 illustrates only one example of a computing device. Many other examples of computing device 140 may be used in other instances and may include a subset of the components included in example computing device 140 or may include additional components not shown example computing device 140 in FIG. 2B.

In some examples, computing device 140 may be a server, tablet computing device, smartphone, wrist- or head-worn computing device, laptop, desktop computing device, or any other computing device that may run a set, subset, or superset of functionality included in application 228.

As shown in the example of FIG. 2B, computing device 116 may be logically divided into user space 242, kernel space 244, and hardware 246, such as described with respect to user space 202, kernel space 204, and hardware 206 of computing device 120 of FIG. 2A.

As shown in FIG. 2, hardware 206 includes one or more processors 248, input components 250, storage devices 252, communication units 254, output components 256, remote device interface 150, and image capture circuitry 148B corresponding in operation to processors 208, input components 210, storage devices 212, communication units 214, output components 216, mobile interface device 130, and image capture circuitry 128B of FIG. 2B.

In some examples, communication units 254 may receive data that includes information risk factors corresponding to features of TTC zone 102. In some examples, communication units 254 may receive sensor data from sensors, as described in relation to FIG. 1.

As shown in FIG. 2B, application 268 executes in user space 242 of computing device 140. Application 268 may be logically divided into presentation layer 262, application layer 264, and data layer 266. Presentation layer 262 may include user interface (UI) component 144, which generates and renders user interfaces of application 268. Application 268 may include, but is not limited to: UI component 144, risk determination component 142, feature identification component 156, TTC zone control component 146, and one or more service components 158. Presentation layer 222 may include UI component 144.

Data layer 226 may include one or more datastores. A datastore may store data in structure or unstructured form. Example datastores may be any one or more of a relational database management system, online analytical processing database, table, or any other suitable structure for storing data.

Service data 233 may include any data to provide and/or resulting from providing a service of service component 138. For instance, service data may include information about pathway articles (e.g., security specifications), user information, operating rule sets, levels of autonomous operation, or any other information transmitted between one or more components of computing device 116. Risk factor data 272 may include any data that includes risk factors that indicate various features of a TTC zone with a risk of an adverse event occurring in the TTC zone. Sensor data 275 may include data that is received from one or more sensors, such as sensors 152 described in relation to FIG. 1. Simulation data 276 may include any data for simulating a TTC zone, such a simulated sensor data and simulated features of the TTC zone.

Service component 158 may, for example, query service data 233 to retrieve a list of recipients for sending a notification of the risk score. In response to, for example, determining that PAAV 110 does not have a level of autonomous vehicle operation capability to meet a minimum level, service component 158 may send data to UI component 144 that causes UI component 144 to generate an alert to a driver to begin non-autonomous operation of PAAV 110 due to an elevated risk score. UI component 144 may send data to an output component of output components 216 that causes the output component to display the alert.

Figure 3A:
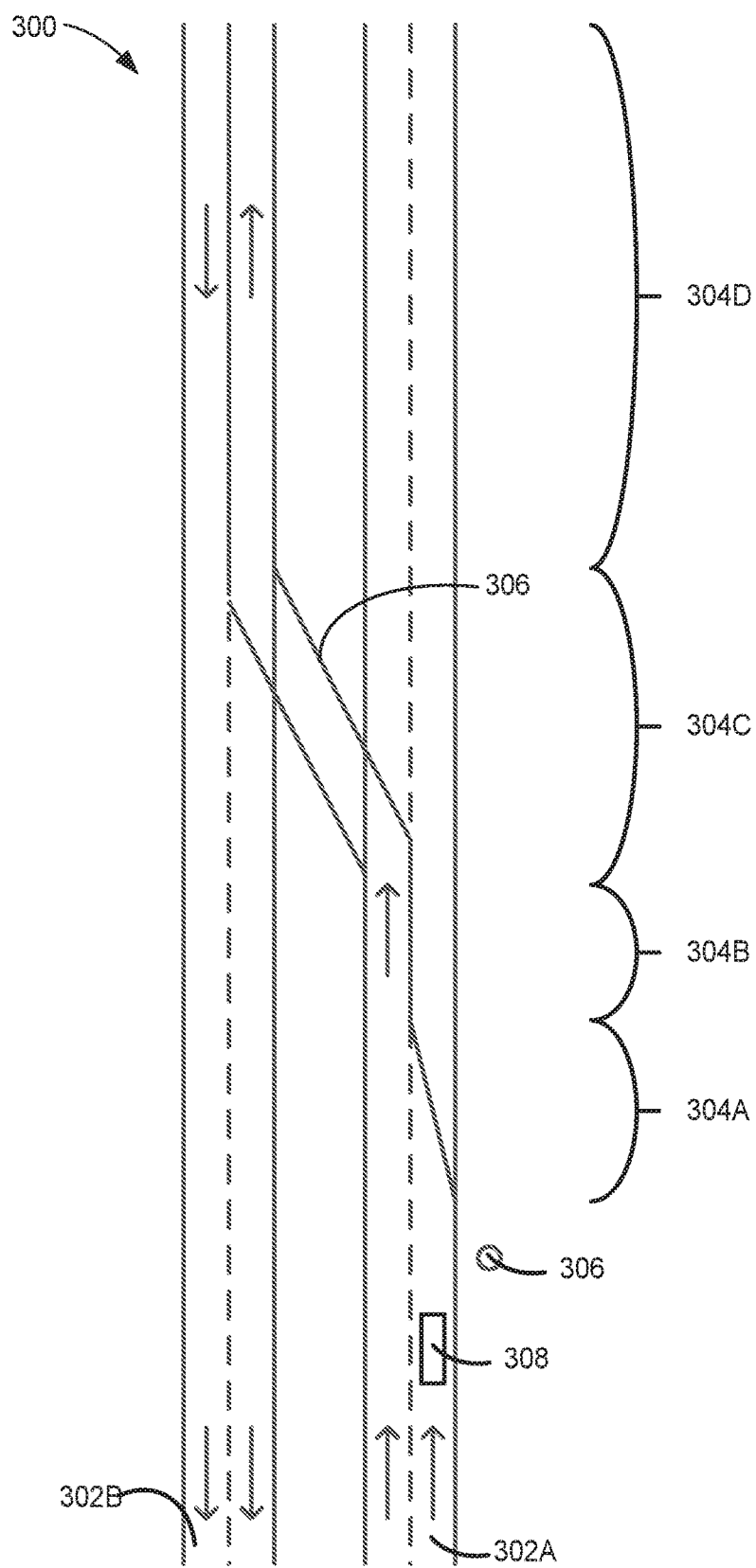
FIG. 3A is a diagram of an example roadway that may be navigated by a pathway-article assisted vehicle, in accordance with one or more aspects of the present disclosure.

FIG. 3A is a diagram of an example TTC zone 300 that may be assessed a risk score as described herein. FIG. 3A will be described with reference to TTC zone monitoring system 112 of FIG. 1.

Under ordinary condition, the pathway of FIG. 3 is a divided four-lane highway that includes a first roadway 302A and a second roadway 302B. First roadway 302A includes two lanes travelling in a first direction and second roadway 302B includes two lanes travelling in a second direction. For example, vehicle 308 is shown travelling on first roadway 302A in the first direction. TTC zone 300 may includes traffic control devices 306, such as barrels and lane markings. At a certain point, the divided four-lane highway becomes TTC 300 and results in an undivided two-lane highway.

TTC zone 300 includes a first region 304A that corresponds to a merge. For example, traffic on first roadway 302A may merge from a right-most lane of first roadway 302A to a left-most lane of first roadway 302A. This merge may be associated with an increase in a risk of an adverse event due to sudden clustering of vehicles and other factors that may increase a likelihood and/or severity of an adverse event occurring. For example, in similar TTC zones and/or in similar merges, an incidence of adverse events may be recorded as adverse event data and correlated to a merge and/or an indication of a merge, such as a sign. As such, presence of a merge may be associated with a particular risk of an adverse event occurring in first region 304A and quantified using a first risk factor (e.g., "3").

TTC zone includes a second region 304B that corresponds to a single-lane same direction roadway. For example, traffic that has merged in first region 304A may proceed as a single lane of traffic. This single lane of traffic may be associated with less risk than a merge but more risk than a two-lane roadway due to an increase in a risk of a vehicle colliding with an adjacent vehicle due to small distance between vehicles from the higher volume from the merge. For example, in similar TTC zones and/or in similar single-lane roadways following a merge, an incidence of adverse effects may be recorded as adverse event data and correlated to both a merge and a single-lane roadway following the merge. As such, presence of both a merge and a single-lane roadway may be associated with a particular risk of an adverse event occurring in second region 304B and quantified using a second risk factor (e.g., "1")

TTC zone 300 includes a third region 304C that corresponds to a lane shift. For example, traffic that has merged and travelling from the merge may shift from first roadway 302A to second roadway 302B. This lane shift may be associated with an increase in a risk of an adverse event due to an uncertain path of travel and uneven pathway conditions. For example, in similar TTC zones and/or in similar lane shifts, an incidence of adverse events may be recorded as adverse event data and correlated to a lane shift and/or an indication of a lane shift, such as a sign. As such, presence of a lane shift may be associated with a particular risk of an adverse event occurring in third region 304C and quantified using a third risk factor (e.g., "4").

TTC zone 300 includes a fourth region 304D that corresponds to a two-lane opposing direction roadway. For example, traffic from first roadway 302A that has shifted to second roadway 302B may travel down the right-most lane of second roadway 302B, while opposing traffic travels down the left-most lane of second roadway 302B. This two-lane opposing direction roadway may be associated with an increase in a risk of an adverse event due to a greater severity of harm in the event of a collision. For example, in similar TTC zones and/or in similar two-lane opposing direction roadways, an incidence of adverse events may be recorded as adverse event data and correlated to a two-lane opposing traffic roadway. As such, presence of a two-lane opposing direction roadway may be associated with a particular risk of an adverse event occurring in fourth region 304D and quantified using a fourth risk factor (e.g., "2").

In addition to traffic control features described above, TTC zone 300 may include other features, such as vehicle features, pathway features, and environmental features, that may affect a risk of an adverse event occurring in TTC zone 102. As an example of a vehicle feature, an amount of traffic may be particularly high due to rush hour, such that a high number of vehicles are merging in first region 304A. As such, a high amount of traffic may be associated with a particular risk of an adverse event occurring in first region 304A and quantified using a fifth risk factor (e.g., "2"). As an example of a pathway feature, a bump in third region 304C caused by a change in surface height between first roadway 302A and second roadway 302B. As such, a bump may be associated with a particular risk of an adverse event occurring in third region 304C and quantified using a sixth risk factor (e.g., "1"). As an example of an environmental feature, rain falling on all of first region 304A, second region 304B, third region 304C, and fourth region 304D. As such, rain may be associated with a particular risk of an adverse event occurring in each of first region 304A and third region 304C (e.g., "1") and in each of second region 304B and fourth region 304D (e.g., "2").

TTC zone monitoring system 112 may receive sensor data corresponding to TTC zone 300. For example, TTC zone monitoring system 112 may include one or more sensors capturing images of traffic control devices associated with regions 304, images of traffic through regions 304, weather conditions near TTC zone 300, pathway conditions in TTC zone 300, and other sensor data that may be used to identify features of TTC zone 300.

TTC zone monitoring system 112 may process the sensor data to identify features of TTC zone 300. For example, TTC zone monitoring system 112 may process image data to identify traffic control devices and classify traffic control features based on the traffic control devices, process image data taken over a period of time to identify vehicle features, process image data to identify pathway features, and process external weather data to identify environmental features.

TTC zone monitoring system 112 may determine a risk score for each of regions 304 based on the risk factors associated with the respective regions. For example, first region 304A may have a risk score of 7, second region 304B may have a risk score of 2, third region 304C may have a risk score of 8, and fourth region 304D may have a risk score of 3. TTC zone 300 may have a cumulative risk score, such as by adding up the risk scores of regions 304. In some examples, TTC zone 300 may have a maximum risk score, such that a PAAV operating in TTC zone 300 may not autonomously operate unless it may do so for the maximum risk score. TTC zone monitoring system 112 may perform an operation based on the risk score for each region 304 or based on the cumulative risk score for TTC zone 300.

In some examples, TTC zone monitoring system 112 may output a notification to nearby vehicles that includes an indication of the risk score. For example, a vehicle driving through TTC zone 300, such as vehicle 308, may receive the indication of a risk score and modify operation, such as through manual operation or autonomous operation, of the vehicle.

Figure 3B:
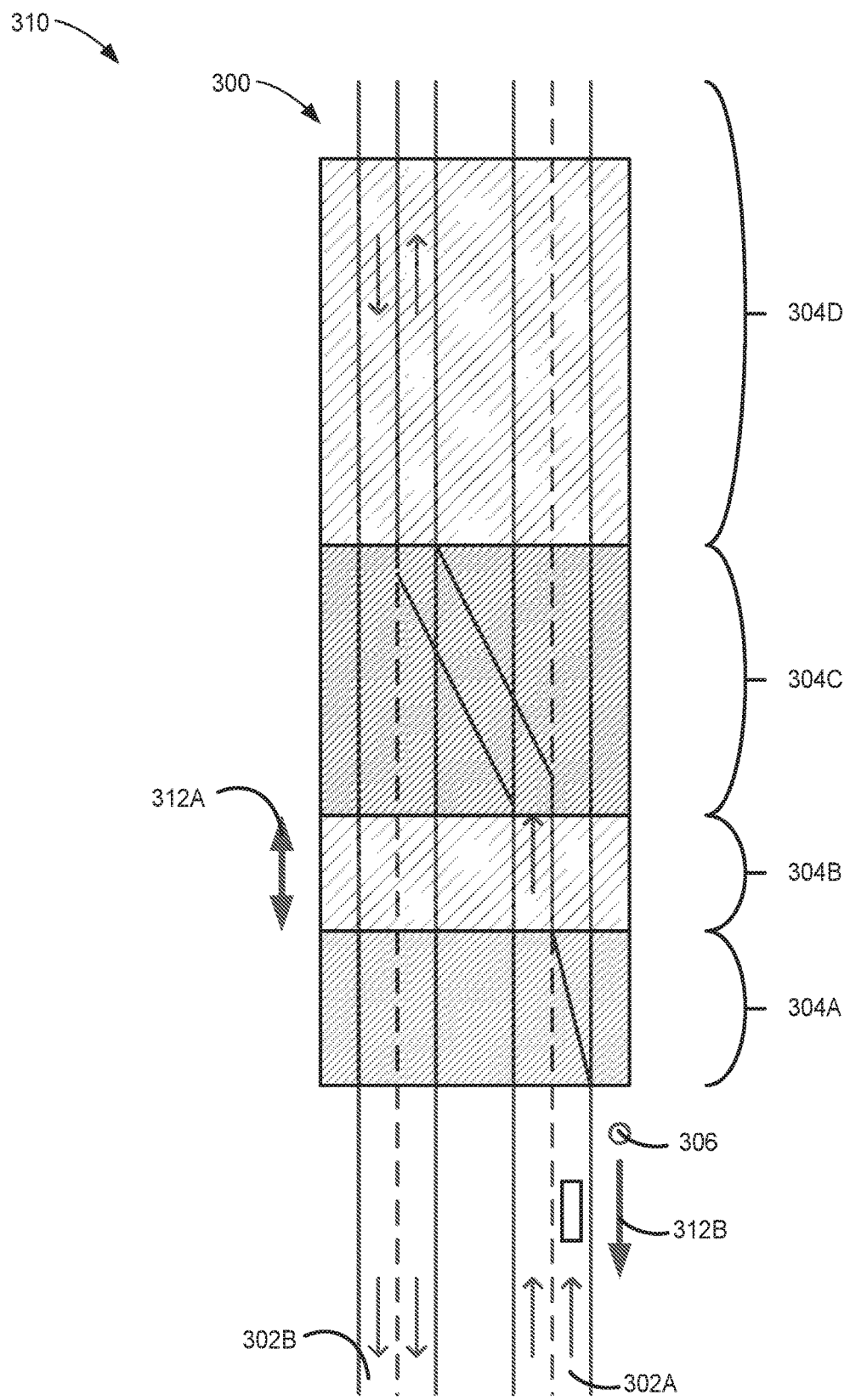
FIG. 3B is an example user interface of the example TTC zone of FIG. 3A, in accordance with one or more aspects of the present disclosure

FIG. 3B is an example user interface 310 of the example TTC zone 300 of FIG. 3A as described herein. For example, user interface 310 may be used by a traffic engineer to further refine TTC zone 300 based on the risk score. As shown in FIG. 3B, user interface 310 includes a spatial map that includes an indication of the risk score corresponding to a spatial representation of the TTC zone. For example, a density of hashes may represent a higher risk score associated with the respective region of TTC zone 102.

TTC zone 300 may be configurable, such that TTC zone monitoring system 112 may generate a spatial placement of the one or more configurable objects that corresponds to a reduction in the risk score. For example, a first spatial place 312A indicates that second region 304B may be expanded to allow for a longer transition between the merge and the lane shift for traffic speeds to normalize. As another example, a second spatial placement 312B of marker 306 may allow for a greater notification time of the merge of first region 304A. In this way, TTC zone monitoring system 112 may use the risk score to prescriptively suggest configurations that reduce a risk score in TTC zone 300.

Figure 3C:
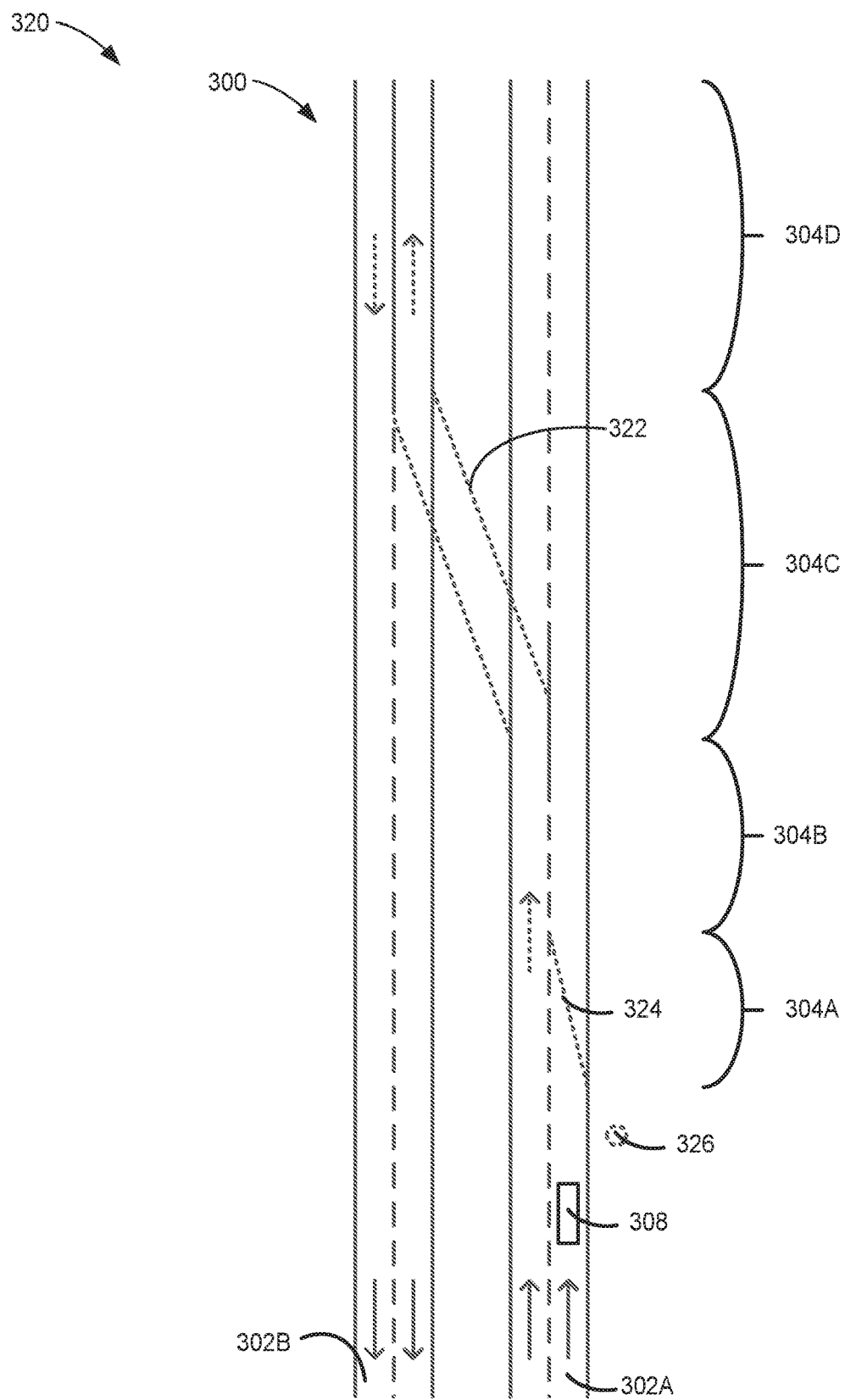
FIG. 3C is an example user interface of the example TTC zone of FIG. 3A as a simulation, in accordance with one or more aspects of the present disclosure.

FIG. 3C is an example user interface 320 of the example TTC zone 300 of FIG. 3A as described herein. In the example of FIG. 3C, TTC zone 300 is simulated, such that features of TTC zone 300 may be presented with a corresponding lower risk score. For example, TTC zone monitoring system 112 may display a lane shift placement 322 for third region 304C that may be extended to allow for a more gradual deviation, may display a lane merge placement 324 for first region 304A that may extend second region 304B to allow for a greater transition between the merge and the lane shift, and may display a marker placement 326 that may allow for sufficient notification of the merge, such that risk score in each region 304 and/or risk scores for TTC zone 300 may be reduced. As such, TTC zone monitoring system 112 may allow for a user, such as a traffic engineer, to simulate TTC zone 300 prior to setting up TTC zone 300.

Figure 4:
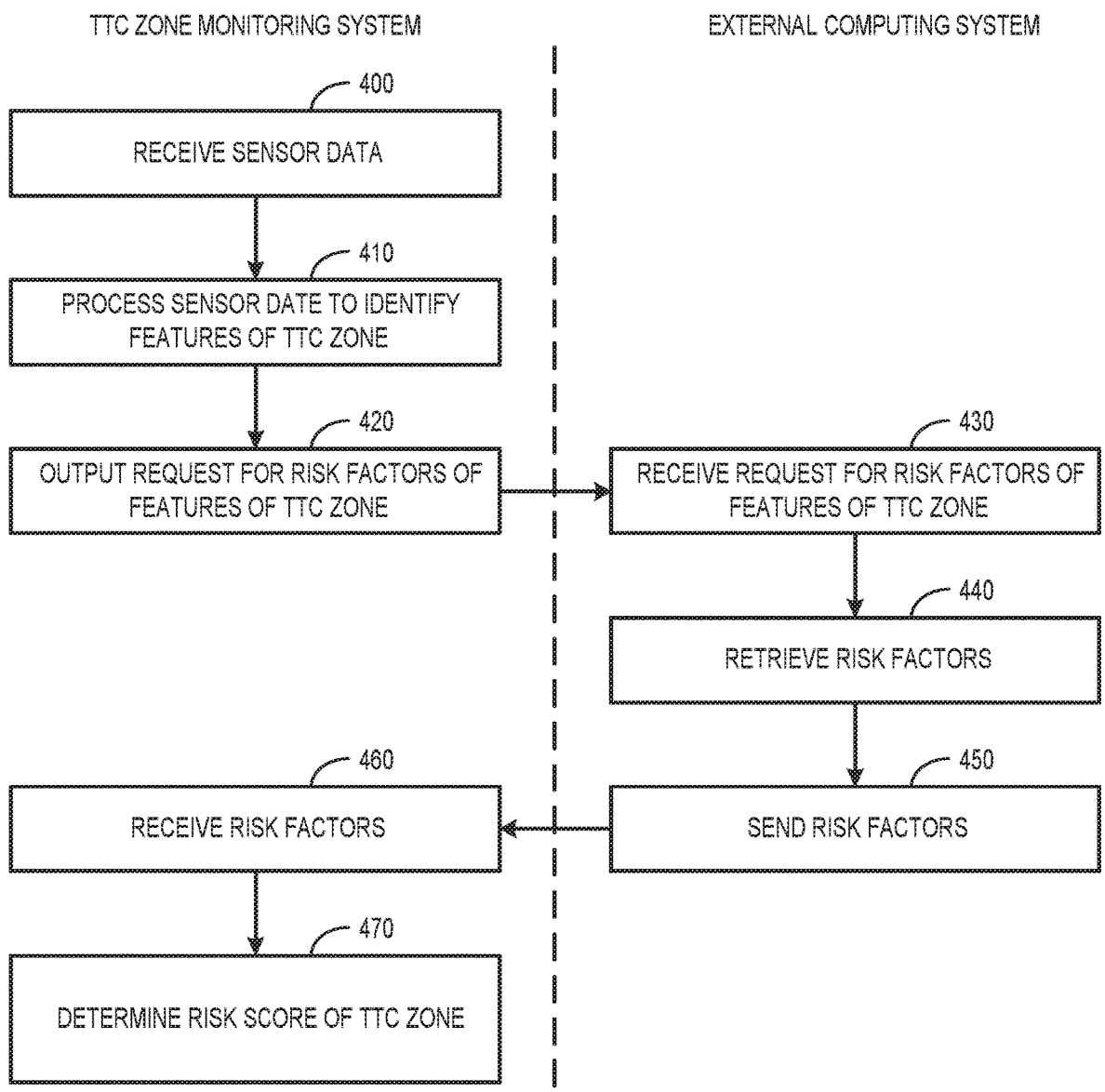
FIG. 4 is a flow diagram illustrating example operation of a computing device for assess risk of a temporary traffic control (TTC) zone, in accordance with one or more techniques of this disclosure.

FIG. 4 is a flow diagram illustrating example operation of a computing device for assess risk of a temporary traffic control (TTC) zone, in accordance with one or more techniques of this disclosure. The techniques are described in terms of TTC zone monitoring system 112, such as computing device 140, and computing device 160 of FIG. 1. However, the techniques may be performed by other computing devices.

In the example of FIG. 4, computing device 140 receives sensor data corresponding to TTC zone 102 of vehicle pathway 104 (400). For example, computing device 140 may receive an image of TTC zone 102 from one of image capture devices 128A. Computing device 140 processes the sensor data to identify one or more features of TTC zone 102 (410). The one or more features may include at least one of traffic control features corresponding to traffic control infrastructure of the TTC zone, vehicle features corresponding to one or more vehicles travelling through the TTC zone, pathway features corresponding to pathway infrastructure of the vehicle pathway of the TTC zone, or environmental features corresponding to a local environment or setting of the TTC zone (410). For example, computing device 140 may use one or more image processing techniques to identify features of TTC zone 102.

Computing device 140 outputs, based on the identified features of TTC zone 102, a request to a remote computing device, such as computing device 160 via network 114, for one or more risk factors (420). Each of the one or more risk factors is indicative of a risk of an adverse event associated with at least one feature of the one or more features of TTC zone 102 based on adverse event data of the at least one feature of the one or more features. For example, the identified features may be associated with a risk factor.

Computing device 160 receives the request for the risk factors (430). In response to receiving the request, computing device 160 retrieves the risk factors (440). For example, the request for the risk factors may include an identifier of the risk factor based on the feature of TTC zone 102. Computing device 160 may look up the risk factor based on the identified feature of TTC zone 102, such as in a database. Computing device 160 sends the risk factors to computing device 140 (450).

Computing device 140 receives the risk factors (460). Computing device 140 determines, based on one or more risk factors, a risk score indicative of a risk of an adverse event in TTC zone 102 (470).

Figure 5:
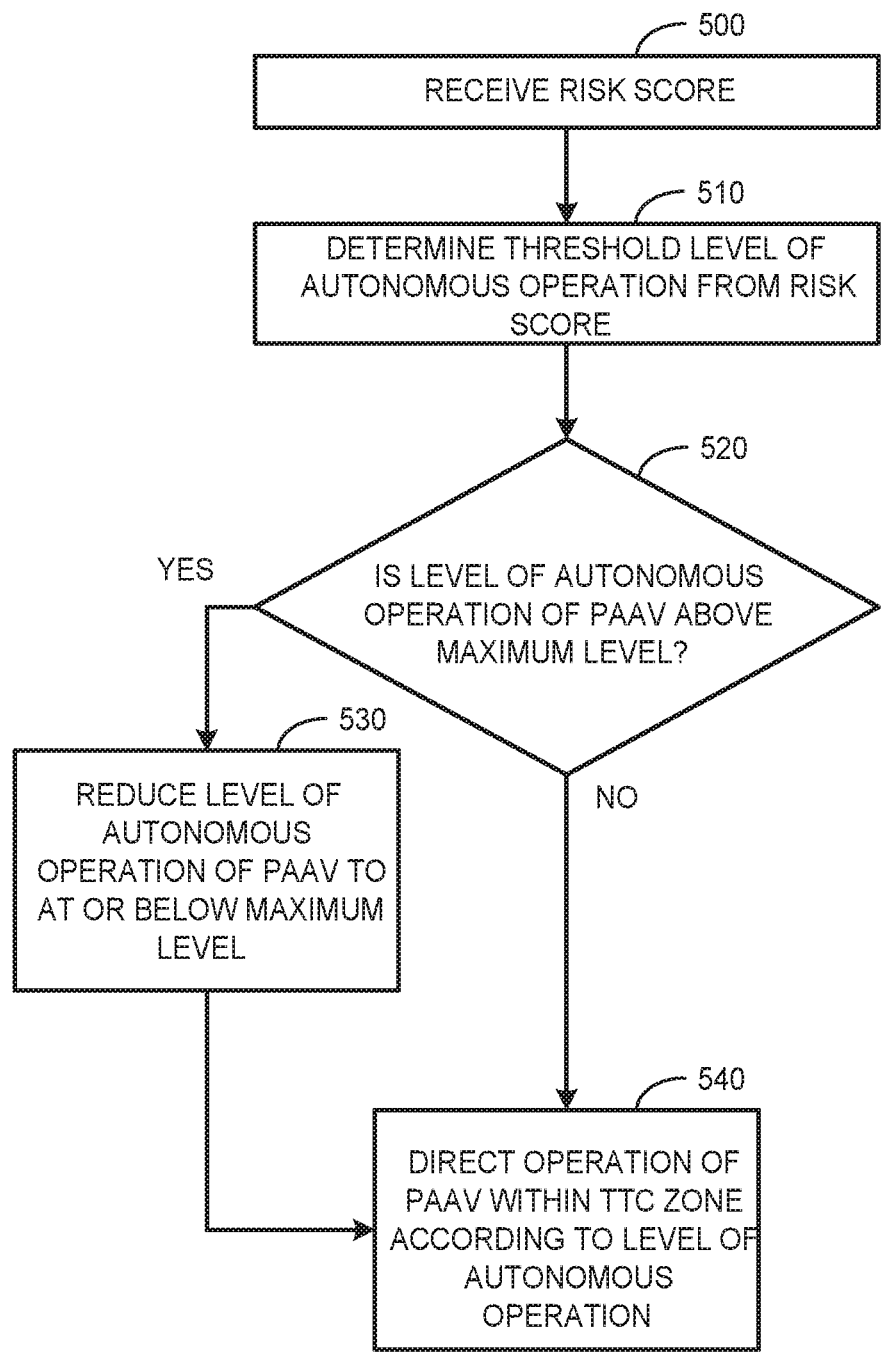
FIG. 5 is a flow diagram illustrating example operation of a computing device for modifying a mode of autonomous operation of a pathway-article assisted vehicle based on a risk score of a temporary traffic control (TTC) zone, in accordance with one or more techniques of this disclosure.

FIG. 5 is a flow diagram illustrating example operation of a computing device for modifying a mode of autonomous operation of a pathway-article assisted vehicle through TTC zone 102 based on a risk score of TTC zone 102, in accordance with one or more techniques of this disclosure. The techniques are described in terms of computing device 120 of FIG. 1. However, the techniques may be performed by other computing devices.

In the example of FIG. 4, computing device 120 receives a risk score of TTC zone 102 (500). For example, computing device 116 may receive the risk score from TTC zone monitoring system 112. Computing device 116 determines, based on the risk score, a threshold level of autonomous operation (510). For example, the risk score may indicate a maximum level of autonomous operation of TTC zone 102. Computing device 120 determines, based on the threshold level of autonomous operation and a current level of autonomous operation of PAAV 110, whether the current level of autonomous operation of PAAV 110 is above a maximum threshold level of autonomous operation for the temporary zone (520). In response to determining that the current level of autonomous operation is above the maximum level of autonomous operation for the temporary zone ("YES"), computing device 120 may reduce the level of autonomous operation of PAAV 110 to or below the maximum level of autonomous operation indicated by the risk score (530). In response to either reducing the level of autonomous operation of PAAV 110 to or below the maximum level indicated by the risk score or determining that the current level of autonomous operation is at or below the maximum level of autonomous operation for TTC zone 102 ("NO"), computing device 120 may direct operations of PAAV 110 within TTC zone 102 according to the current level of autonomous operation.

Various examples have been described. These and other examples are within the scope of the following claims.

What is claimed is:

1. A system comprising:
    at least one sensor configured to generate sensor data corresponding to a temporary traffic control (TTC) zone of a vehicle pathway, wherein the at least one sensor is fixed at a position proximal to the TTC zone; and
    a computing device configured to:
        process the sensor data to identify one or more features of the TTC zone, wherein the one or more features include at least one of traffic control features corresponding to traffic control infrastructure of the TTC zone, vehicle features corresponding to one or more vehicles travelling through the TTC zone, pathway features corresponding to pathway infrastructure of the vehicle pathway of the TTC zone, or environmental features corresponding to a local environment or setting of the TTC zone;
        determine, based on one or more risk factors, a risk score indicative of a risk of an adverse event in the TTC zone, wherein each of the one or more risk factors is indicative of a risk of an adverse event associated with at least one feature of the one or more features of the TTC zone based on adverse event data of the at least one feature of the one or more features; and
        perform, based on the risk score, at least one operation, wherein performing, based on the risk score, at least one operation comprises generating a spatial map that includes an indication of the risk score corresponding to a spatial representation of the TTC zone.

2. The system of claim 1, wherein the vehicle features comprise one or more of a speed of a vehicle in the TTC zone, a number or rate of passage of a plurality of vehicles in the TTC zone, a type of a vehicle in the TTC zone, a position of a vehicle in the TTC zone, a relative position of a plurality of vehicles in the TTC zone, a pattern of behavior of a vehicle in the TTC zone, or historical data of a vehicle or driver of a vehicle in the TTC zone.

3. The system of claim 1, wherein the traffic control features comprise one or more of a position or location of an infrastructure article or a type of an infrastructure article.

4. The system of claim 3, wherein the infrastructure article comprises at least one of a cone, barrel, barricade, lane marking, or sign in the TTC zone.

5. The system of claim 1, wherein the environmental features comprise one or more of a time of day, a type of a weather condition, a severity of a weather condition, or a time of year.

6. The system of claim 1, wherein the at least one sensor comprises one or more of an image sensor, an acoustic sensor, a light sensor, Light Detection and Ranging (LiDAR) sensor, GPS sensor, or a radio frequency sensor.

7. The system of claim 1, wherein an adverse event in the TTC zone includes a collision involving a first vehicle and at least one of a pathway article, a second vehicle, a worker, or a pedestrian in the TTC zone.

8. The system of claim 1, wherein performing, based on the risk score, at least one operation further comprises transmitting the indication of the risk score of the TTC zone to at least one vehicle in the TTC zone.

9. The system of claim 1, wherein the TTC zone of the vehicle pathway is a configurable zone of the vehicle pathway that includes a set of pathway rules, and wherein performing the at least one operation further comprises generating a pathway rule for the set of pathway rules.

10. The system of claim 9, wherein the configurable zone of the vehicle pathway includes a display device configured to indicate at least one pathway rule of the set of pathway rules, and wherein performing the at least one operation further comprises sending an indication of the pathway rule to the display device.

11. The system of claim 1, wherein determining, based on the one or more risk factors, the risk score for the TTC zone comprises:
applying a feature vector to the one or more risk factors to a trained model; and
determining, using the trained model, the risk score.

12. The system of claim 1, wherein determining the risk score for each of the one or more features comprises parameterizing the one or more features of the zone based on the risk factors.

13. A system comprising:
at least one sensor configured to generate sensor data corresponding to a temporary traffic control (TTC) zone of a vehicle pathway, wherein the at least one sensor is fixed at a position proximal to the TTC zone; and
a computing device configured to:
process the sensor data to identify one or more features of the TTC zone, wherein the one or more features include at least one of traffic control features corresponding to traffic control infrastructure of the TTC zone, vehicle features corresponding to one or more vehicles travelling through the TTC zone, pathway features corresponding to pathway infrastructure of the vehicle pathway of the TTC zone, or environmental features corresponding to a local environment or setting of the TTC zone;
determine, based on one or more risk factors, a risk score indicative of a risk of an adverse event in the TTC zone, wherein each of the one or more risk factors is indicative of a risk of an adverse event associated with at least one feature of the one or more features of the TTC zone based on adverse event data of the at least one feature of the one or more features; and
perform, based on the risk score, at least one operation,
wherein the TTC zone of the pathway is a configurable zone of the pathway that includes one or more configurable objects, and wherein performing the at least one operation further comprises generating a spatial placement of the one or more configurable objects that corresponds to a reduction in the risk score.

14. A system comprising:
at least one sensor configured to generate sensor data corresponding to a temporary traffic control (TTC) zone of a vehicle pathway, wherein the at least one sensor is fixed at a position proximal to the TTC zone; and
a computing device configured to:
process the sensor data to identify one or more features of the TTC zone, wherein the one or more features include at least one of traffic control features corresponding to traffic control infrastructure of the TTC zone, vehicle features corresponding to one or more vehicles travelling through the TTC zone, pathway features corresponding to pathway infrastructure of the vehicle pathway of the TTC zone, or environmental features corresponding to a local environment or setting of the TTC zone;
determine, based on one or more risk factors, a risk score indicative of a risk of an adverse event in the TTC zone, wherein each of the one or more risk factors is indicative of a risk of an adverse event associated with at least one feature of the one or more features of the TTC zone based on adverse event data of the at least one feature of the one or more features; and
perform, based on the risk score, at least one operation,
wherein the TTC zone comprises a first region and a second region, and wherein the computing device is further configured to:
determine, based on one or more first risk factors indicative of risk of an adverse event associated with the one or more features of the first region of the TTC zone, a first risk score indicative of a risk of an adverse event in the first region of the TTC zone;
determine, based on one or more second risk factors indicative of risk of an adverse event associated with the one or more features of the second region of the TTC zone, a second risk score indicative of a risk of an adverse event in the second region of the TTC zone; and
determine, based on the first risk score of the first region and the second risk score of the second region, an overall risk score of the TTC zone.

* * * * *